(12) United States Patent
Sitko (10) Patent No.: US 11,486,496 B2
(45) Date of Patent: Nov. 1, 2022

(54) SPOKED ROTARY SEAL

(71) Applicant: Trelleborg Sealing Solutions Germany GmbH, Stuttgart (DE)

(72) Inventor: Mark C. Sitko, Fort Wayne, IN (US)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 72 days.

(21) Appl. No.: 17/137,888

(22) Filed: Dec. 30, 2020

(65) Prior Publication Data

US 2021/0207713 A1 Jul. 8, 2021

Related U.S. Application Data

(60) Provisional application No. 62/957,602, filed on Jan. 6, 2020.

(51) Int. Cl.
*F16J 15/3284* (2016.01)

(52) U.S. Cl.
CPC ................. *F16J 15/3284* (2013.01)

(58) Field of Classification Search
CPC ...... F16J 15/32; F16J 15/3204; F16J 15/3208; F16J 15/322; F16J 15/3268; F16J 15/3284
See application file for complete search history.

(56) References Cited

U.S. PATENT DOCUMENTS

| | | | |
|---|---|---|---|
| 2,434,484 A * | 1/1948 | Chambers, Jr. ...... | F16J 15/3212 277/553 |
| 2,536,623 A | 1/1951 | Brown et al. | |
| 2,665,151 A * | 1/1954 | Fisler ...................... | F16J 15/20 277/530 |
| 2,807,483 A * | 9/1957 | Cornelius ................ | F16J 15/32 277/561 |
| 3,447,810 A | 6/1969 | Porter | |
| 4,403,779 A | 9/1983 | Wilkinson | |
| 5,344,164 A | 9/1994 | Carmody et al. | |
| 5,377,999 A * | 1/1995 | Gorman ............... | F16J 15/3272 277/922 |
| 7,219,898 B2 | 5/2007 | Mormile et al. | |
| 8,052,152 B2 | 11/2011 | Sedlar et al. | |
| 9,689,496 B2 | 6/2017 | Wilkins et al. | |
| 2004/0150168 A1 * | 8/2004 | Heathcott ............ | F16J 15/3236 277/500 |
| 2006/0006607 A1 | 1/2006 | Denton et al. | |
| 2008/0217865 A1 | 9/2008 | Sedlar et al. | |
| 2011/0024990 A1 | 2/2011 | Berdichevsky | |
| 2017/0292526 A1 | 10/2017 | Fabbri et al. | |

FOREIGN PATENT DOCUMENTS

EP 0 349 180 A2 1/1990

OTHER PUBLICATIONS

Notification of Transmittal of the International Search Report and the Written Opinion of the International Searching Authority, or the Declaration dated Apr. 7, 2021 for International Application No. PCT/US2020/067457 (9 pages).

* cited by examiner

*Primary Examiner* — Gilbert Y Lee (74) *Attorney, Agent, or Firm* — Hackler Daghighian Martino & Novak (57) ABSTRACT

A seal for sealing a shaft, the seal including a seal body having an inner member, an outer member, and a connecting member connecting the inner member and the outer member. The seal also includes at least one spoke connected to the seal body. The at least one spoke is configured to stiffen the seal body.

18 Claims, 8 Drawing Sheets

SPOKED ROTARY SEAL

CROSS REFERENCE TO RELATED APPLICATIONS

This is a non-provisional application based upon U.S. provisional patent application Ser. No. 62/957,602, entitled "SPOKED ROTARY SEAL", filed Jan. 6, 2020, which is incorporated herein by reference.

BACKGROUND OF THE INVENTION

1. Field of the Invention

The present invention relates to sealing devices, and, more particularly, to a rotary seal for sealing a rotating shaft and a stationary housing.

2. Description of the Related Art

Various shaft seals for establishing a fluid tight seal between a stationary housing and a rotating shaft are known in the art. Typically, a shaft seal includes a body and garter springs to facilitate maintaining a seal lip of the seal in sealing engagement with the shaft. Such seals are effective however they are costly to manufacture. Additionally, such seals are relatively large and heavy, which may negatively impact the operation of the shaft since they typically occupy a larger area and increase the overall weight of the shaft assembly.

What is needed in the art is a cost-effective seal for creating a fluid tight seal in between a shaft and a stationary housing.

SUMMARY OF THE INVENTION

The present invention provides a rotary seal for sealing a shaft. The seal includes a body with an inner, dynamic member, an outer, static member, and a connecting member in between the inner and outer members. The seal also includes at least one spoke disposed within or on top of the seal body. The seal is configured to dynamically flex but not rotate with the shaft.

The present invention in one form is directed to a seal for sealing a shaft. The seal including a seal body having an inner member, an outer member, and a connecting member connecting the inner member and the outer member. The seal also includes at least one spoke connected to the seal body. The at least one spoke is configured to stiffen the seal body.

The present invention in another form is directed to a method for sealing a shaft. The method includes an initial step of providing a seal. The seal includes a seal body having an inner member, an outer member, and a connecting member connecting the inner member and the outer member. The seal also includes at least one spoke. The method also includes inserting the at least one spoke into the seal body such that the connecting member and the at least one spoke are together configured to allow the inner member to dynamically flex and prevent the outer member from rotating. The method further includes connecting the seal to the shaft.

An advantage of the present invention is that the seal is both flexible and rigid due to its flexible connecting member and relatively rigid spoke(s).

Another advantage of the present invention is that the seal effectively seals an area between a dynamic, rotating shaft and a static, stationary housing without adding undue weight to the sealing assembly or sacrificing the structural integrity of the seal.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
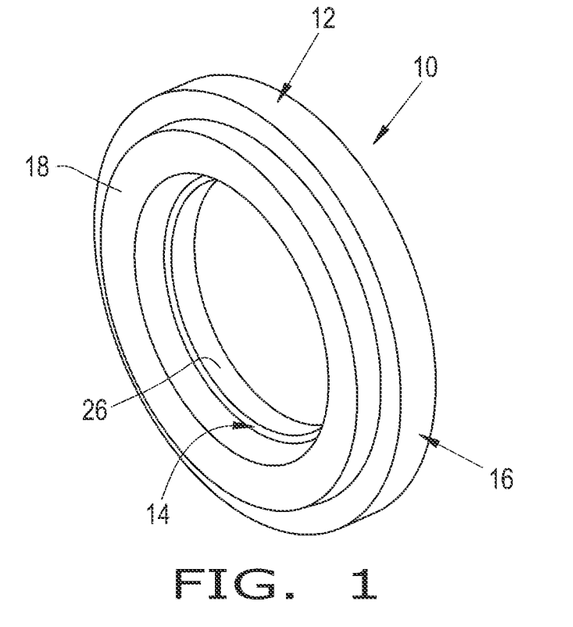
FIG. 1 is a perspective view of an embodiment of a spoked radial seal which includes internally disposed spokes.
Figure 2:
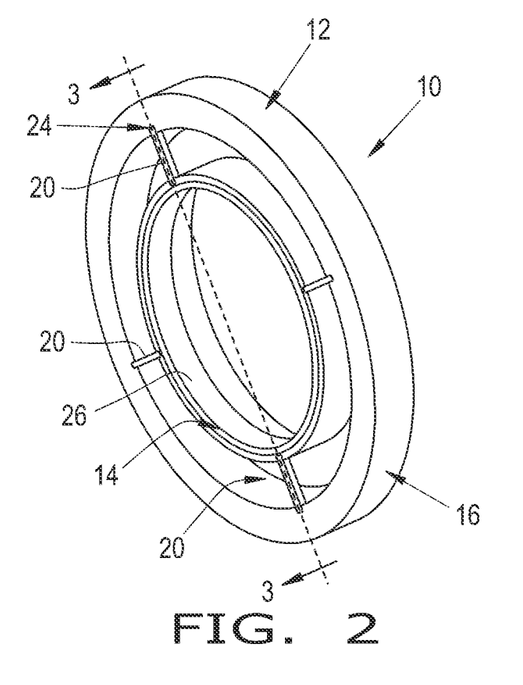
FIG. 2 is another perspective view of the radial seal of FIG. 1.
Figure 3:
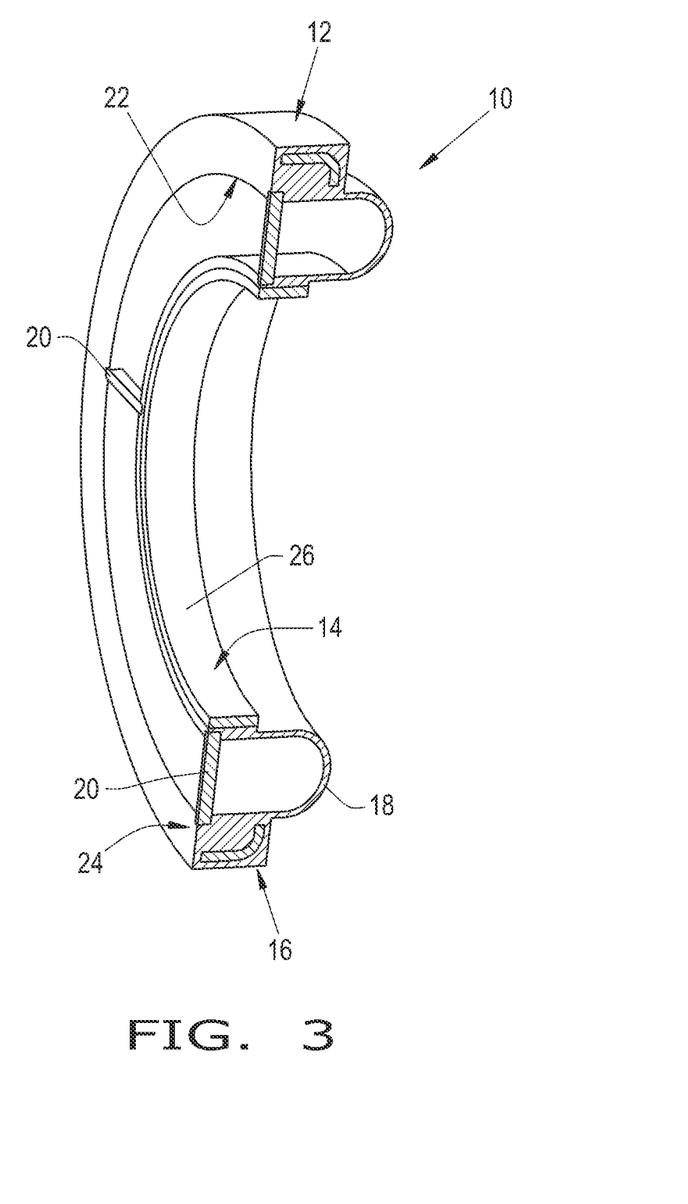
FIG. 3 is a cross-sectional view of the radial seal, taken across line 3-3 of FIG. 2.

Referring now to the drawings, and more particularly to FIGS. 1-3, there is shown an embodiment of a spoked rotary, e.g. radial, seal 10 which allows for radial movement, such as a movement which is perpendicular to the longitudinal axis of a shaft. The seal 10 also prevents rotational movement that would otherwise cause the seal 10 to spin with the shaft. The seal 10 may seal the space in between the shaft and a corresponding bore within the housing. The seal 10 generally includes a seal body 12 with an inner dynamic member 14, an outer static member 16, and a middle connecting or linking member 18. The seal 10 also includes at least one insert 20, for example spoke 20, that is disposed within the seal body 12.

The seal body 12 may be annular in shape. The seal body 12 may comprise any desired material, such as a polymer. The inner dynamic member 14 is positioned on the inside of the seal 10 and defines the inner diameter of the seal 10. The inner dynamic member 14 may contact and engage with the shaft. The inner dynamic member 14 may move or flex with a movement of the shaft. Hence, the inner member 14 is considered dynamic as it accommodates a shaft runout, wobble, angular movement, vibrations, rotation, and/or any other shaft movement or misalignment. The inner dynamic member 14 may be a separate seal element that is affixed to another portion of the seal body 12 or integrally formed as part of the seal body 12. Additionally, the inner dynamic member 14 may accommodate a separate seal element 26 which rests on top of the inner dynamic member 14. The inner dynamic member 14 may have any desired cross-sectional shape. The outer static member 16 is positioned on the outside of the seal 10 and defines the outer diameter of the seal 10. The outer static member 16 may engage with the bore in which the seal 10 is located. The outer static member 16 may be reinforced with an internal reinforcing member, such as a metal ring. The outer static member 16 may have any desired cross-sectional shape.

The middle connecting member 18 of the seal body 12 may connect or link the dynamic and static members 14, 16 together. In other words, the middle connecting member 18 rigidly couples the dynamic and static members 14, 16 together. Thus, the middle connecting member 18 may dually serve to connect and radially space apart the dynamic and static members 14, 16. The middle connecting member 18 may be in the form of a weak linkage such that a desired fluid seal may be created without creating excess rigidity which would otherwise prevent the dynamic member 14 from moving with the shaft. Thereby, the seal 10 may dynamically flex, e.g. collapse, bend, partially rotate, etc., without rotating with the shaft. The middle connecting member 18 may have any desired cross-section shape. For instance, the middle connecting member 18 may have a substantially C-shaped cross-sectional shape. Thereby, the middle connecting member 18 may have one side, e.g. concave side, which defines an open cavity 22 and an opposite side, e.g. convex side, that curves outwardly in between the dynamic and static members 14, 16.

The spokes 20 are disposed within cavity 22 of the seal body 12. More particularly, the spokes 20 are positioned within respective recesses 24 of the seal body 12. The spokes 20 may extend in between the inner dynamic member 14 and the outer static member 16; and hence, through the cavity 22 formed by the middle connecting member 18. The spokes 20 may be circumferentially spaced apart from one another. The spokes 20 may have some separation between their lateral ends and their respective mating surfaces. This separation between the ends of the spokes 20 and mating surfaces can allow for shaft misalignment without significantly effecting the seal loading profile against the shaft. The seal 10 may include two or more spokes 20, such as four spokes. The spokes 20 may comprise any desired shape and material. For instance, each spoke 20 may be in the form of a rigid plastic and/or metallic C-channel-type beam. Furthermore, each spoke 20 may be a separate element which is affixed to the seal body 12.

Together the middle connecting member 18 and the added spokes 20 allow for some radial movement, e.g. allowing the inner diameter of the dynamic member 14 to flex; thus, bending or collapsing the C-shape of the middle connecting member 18, while also preventing the entire seal body 12 from rotating. In other words, the rigid, yet partially dynamic, relationship between the dynamic and static members 14, 16, due to the structural connections of the spokes 20 and connecting member 18, allow some movement, including some limited rotation of the inner diameter of the seal body 12, but prevent the outer diameter of the seal 10 to rotate. Thereby, the seal 10 is prevented from rotating but the seal 10 may experience some dynamic flexing in the rotational direction of the shaft to limit breakout torque.

Figure 4:
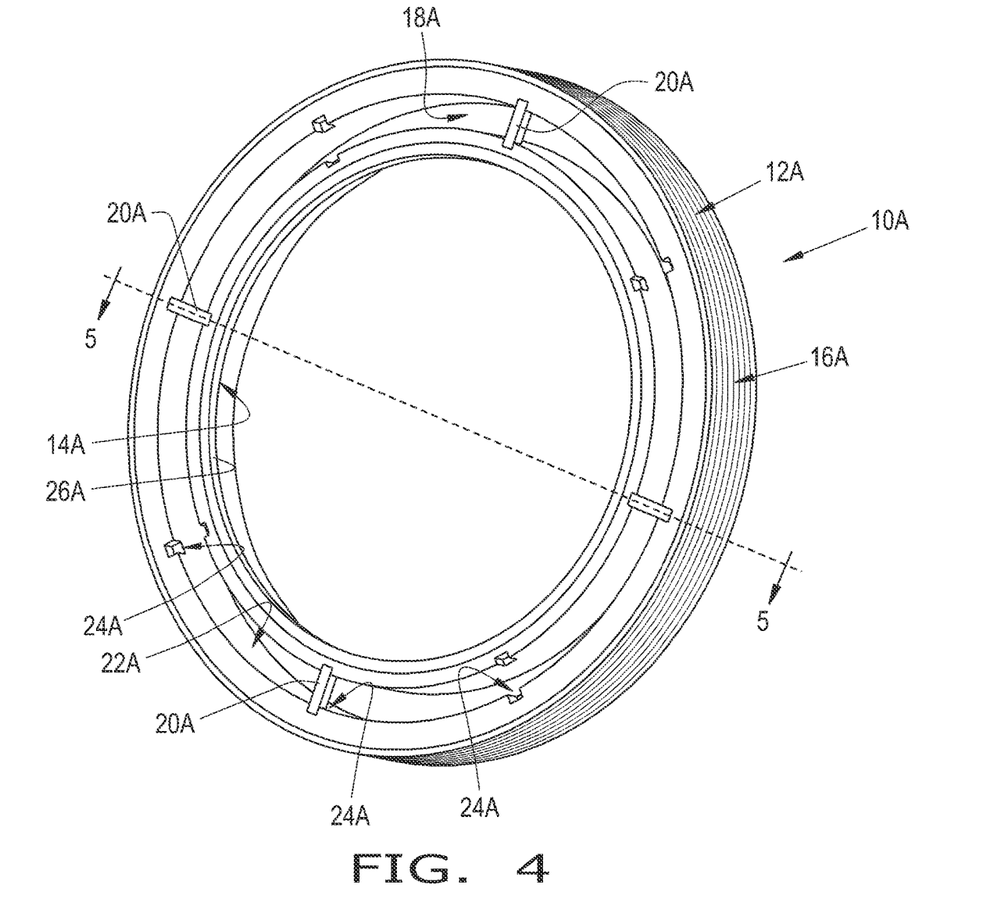
FIG. 4 is a perspective view of an embodiment of a spoked radial seal which includes internally disposed spokes.
Figure 5:
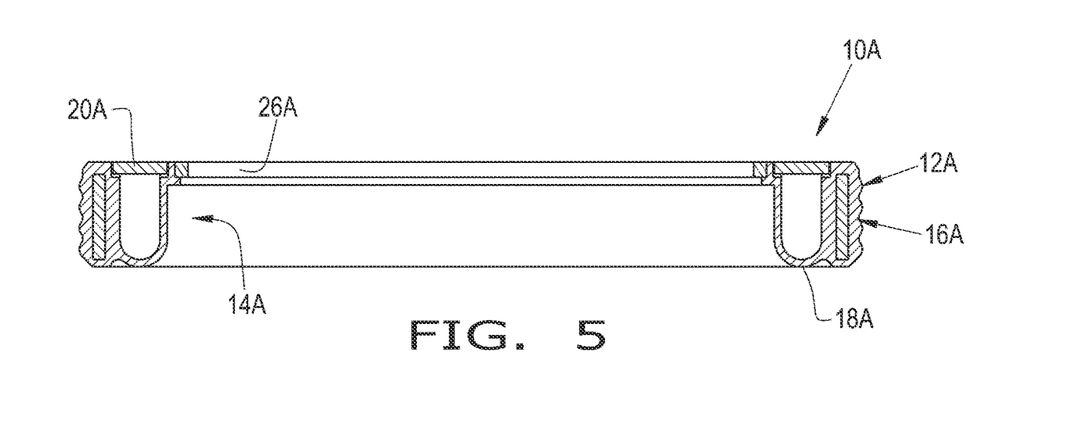
FIG. 5 is a cross-sectional view of the radial seal, taken across line 5-5 of FIG. 4.

Referring now to FIGS. 4-5, there is shown another embodiment of a spoked radial seal 10A which may be substantially similar to the radial seal 10, except that the radial seal 10A has a differing body shape, an inner static member 14A with a groove to receive a seal element 26A therein, and an outer static member 16A with a ribbed surface profile. Like elements have been identified with like reference characters, except for the "A" series designation.

Figure 6:
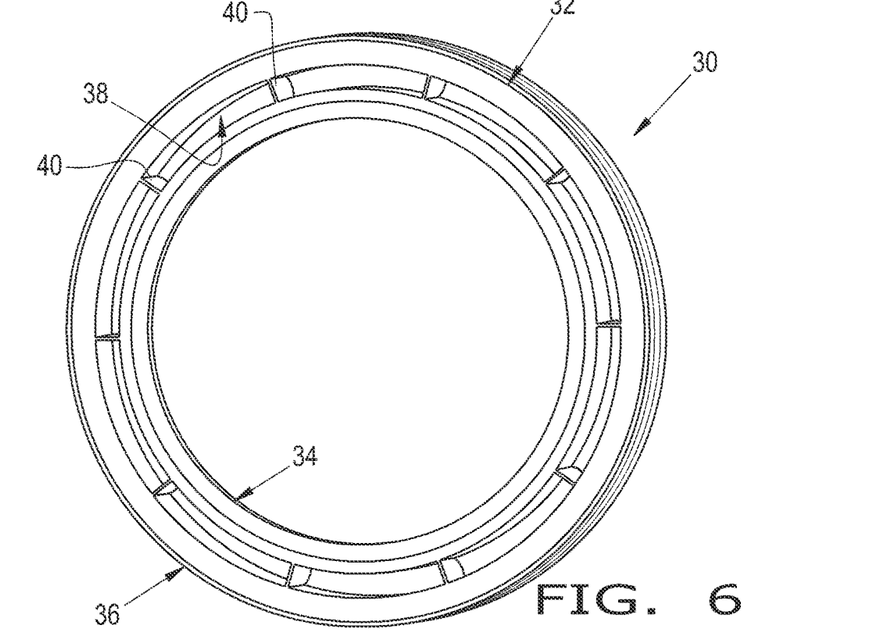
FIG. 6 is a perspective view of another embodiment of a spoked radial seal which includes integrally formed spokes.

Referring now to FIG. 6, there is shown another embodiment of a rotary seal 30. The rotary seal 30 is a monolithic seal 30 which has integrally formed spokes 40. The seal 30 may be substantially similar to the seal 10, except that the spokes 40 are molded or otherwise integrated into the seal body 32 within the middle connecting member 38 and in between the dynamic and static members 34, 36.

The spokes 40 are integrated, i.e., monolithically formed, with the seal body 32. The spokes 40 may comprise any desired shape and material. For instance, each spoke 40 may have a rectangular cross-section. The spokes 40 may comprise the same material as the seal body 32. The seal 30 may include any desired number of spokes 40, such as two, four, ten, or more spokes.

Figure 7:
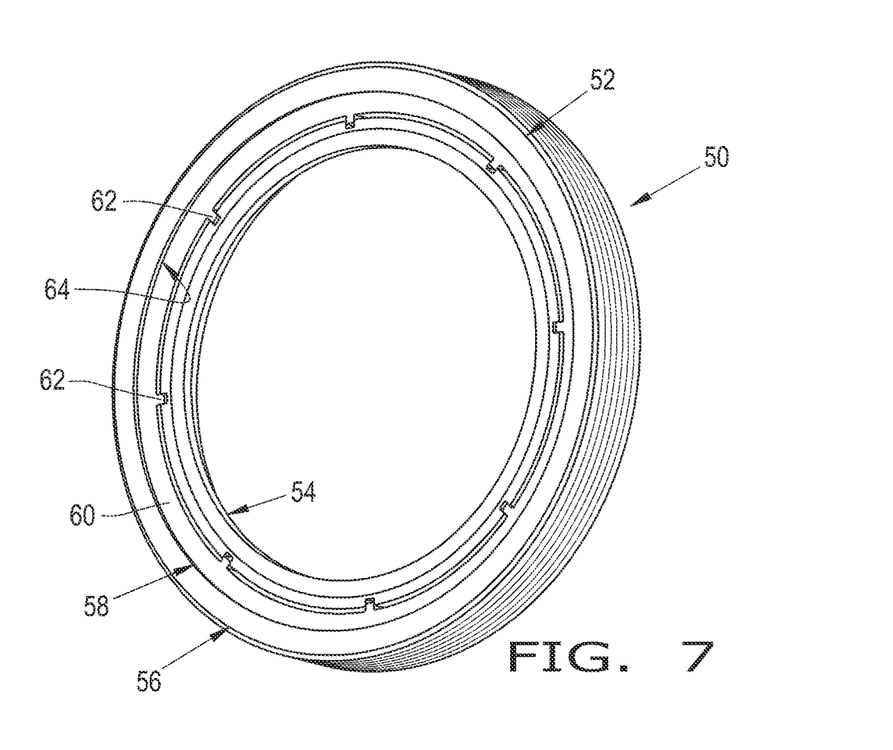
FIG. 7 is a perspective view of another embodiment of a spoked radial seal which includes a single spoked insert.

Referring now to FIG. 7, there is shown another embodiment of a radial seal 50. The seal 50 may be substantially similar to the seals 10, 10A, 30, as described above. The seal 50 includes the seal body 52 with the dynamic and static members 54, 56 and the middle connecting member 58. The seal 50 further includes a spoked insert 60 with multiple spokes 62 thereon which engage with corresponding recesses 64 in the seal body 52.

The spoked insert 60 may fit within the middle connecting member 58. The spoked insert 60 may or may not have a corresponding C-shape that fills the cavity within the middle connecting member 58. The spoked insert 60 may have any desired number of protrusions spokes 62, such as one, two, four, eight, or more spoke(s) 62. The spokes 62 may be located on only one side, e.g. the inner side, of the insert 60. The spokes 62 may be in the form of rectangular protrusions which extend radially inward toward the shaft and within the recesses 64, which have a corresponding shape and size. The spoked insert 60 may comprise any desired material.

Figure 8:
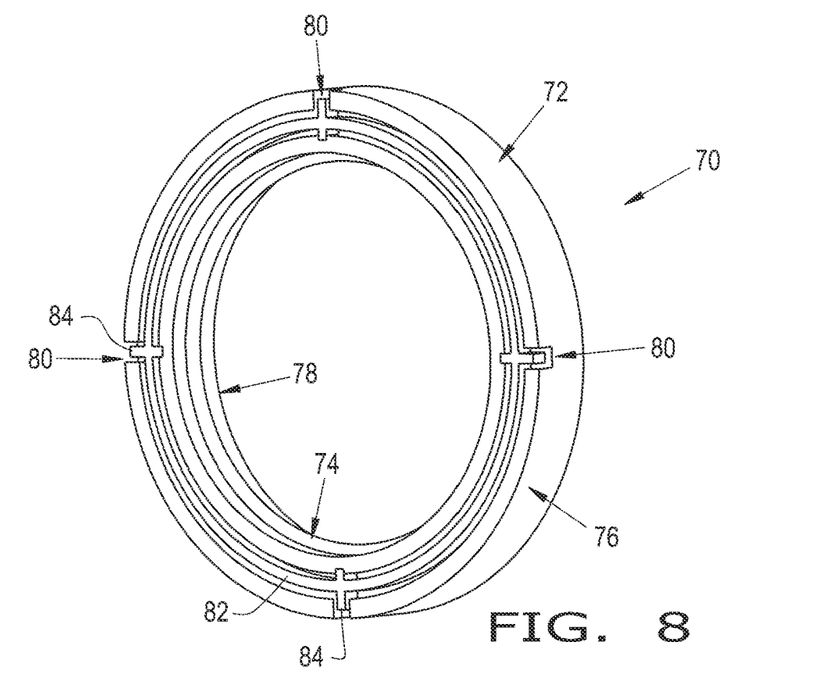
FIG. 8 is a perspective view of another embodiment of a radial seal which includes slots and a single spoke with protrusions which extend into the slots.

Referring now to FIG. 8, there is shown another embodiment of a radial seal 70. The seal 70 may be similar to the seals 10, 10A, 30, 50, as described above. The seal 70 includes a seal body 72 with the dynamic and static members 74, 76 and the middle connecting member 78. The seal body 72 further includes slots 80 which may extend through the exterior surface of the seal body 72.

The seal 70 further includes a spoked insert 82 with multiple protrusions or spokes 84 on both sides of the spoked insert 82. The spokes 84 engage with corresponding recesses 80 in the seal body 72. The spoked insert 82 may fit within the middle connecting member 78. The spoked insert 82 may have any desired number of protrusions spokes 84. The spokes 84 may be in the form of rectangular protrusions which extend radially inward toward the shaft and outward toward the exterior surface of the seal body 72. The spoked insert 82 may comprise any desired material.

Figure 9:
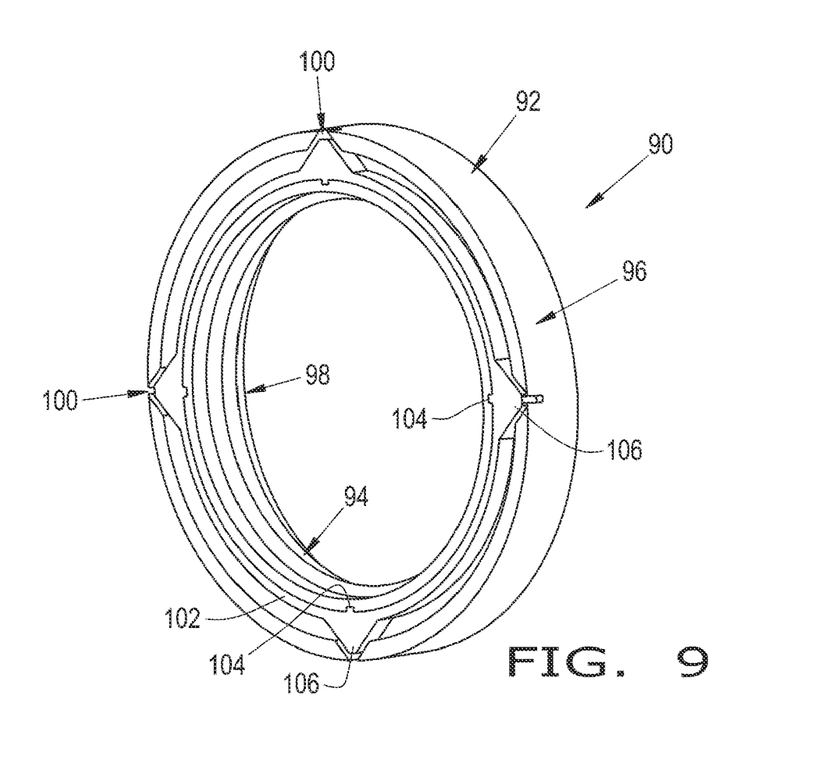
FIG. 9 is a perspective view of another embodiment of a radial seal which includes slots and a single spoke with pyramidal protrusions which extend into the slots.

Referring now to FIG. 9, there is shown another embodiment of a radial seal 90. The seal 90 may be similar to the seals 10, 10A, 30, 50, 70, as described above. The seal 90 includes a seal body 92 with the dynamic and static members 94, 96 and the middle connecting member 98. The seal body 92 further includes slots 100 which may extend through the exterior surface of the seal body 92.

The seal 90 further includes a spoked insert 102 with multiple protrusions or spokes 104, 106 on both sides of the spoked insert 102. The spoked insert 102 may have a first set of inwardly extending spokes 104 and a second set of externally extending spokes 106. The first set of spokes 104 may be smaller than the second set of spokes 106. The first set of spokes 104 may have a rectangular shape. The second set of spokes 106 may have a pyramidal shape. In other words, the second set of spokes 106 may comprise a tooth-like profile. The spoked insert 102 may fit within the middle connecting member 98. The spoked insert 102 may have any desired number of protrusions spokes 104, 106. The spoked insert 102 may comprise any desired material.

Figure 10:
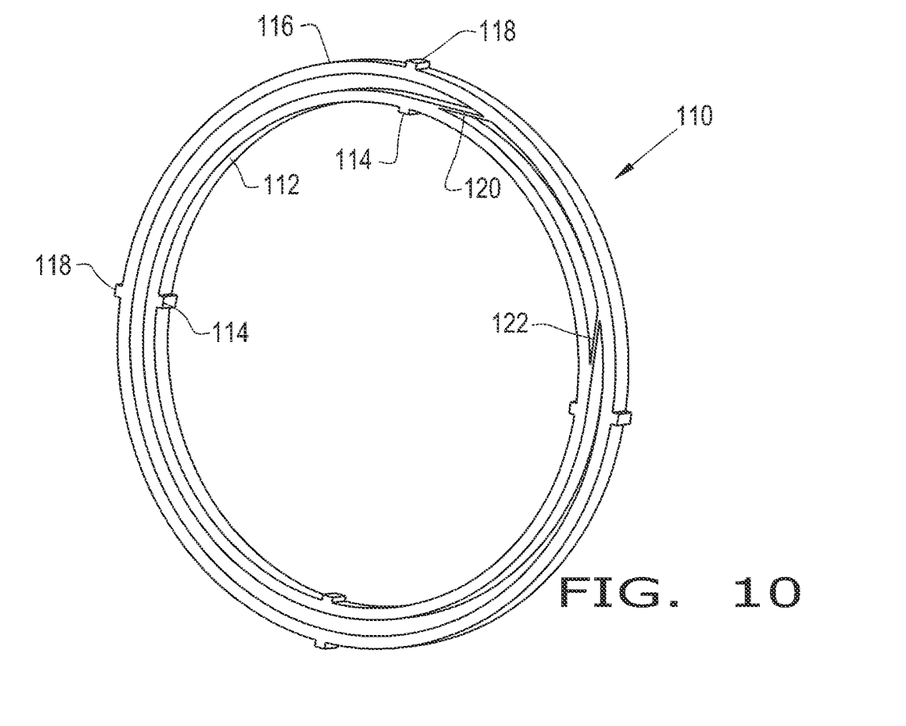
FIG. 10 is a perspective view of an embodiment of a spoke which is receivable within a radial seal.

Referring now to FIG. 10, there is shown an embodiment of a multipart a spoked insert 110. The insert 110 may be fitted within a seal body 72, as described above. The insert 110 may include a first, inner ring 112 with multiple spokes 114 and a second, outer ring 116 with multiple spokes 118. The inner and outer rings 112, 116 may be connected to one another by at least one ring connecting member 120. The at least one connecting member 120. 122 may be in the form of one or more connecting arms 120, 122. For instance, the insert 110 may have a pair of connecting arms 120, 122 which extend in opposite directions. The at least one connecting arm 120, 122 may allow the inner and outer rings 112, 116 to flex relative to one another. The insert 110 may comprise any desired material. The inner ring 112, the outer ring 116, and connecting member 120 may or may not comprise the same material.

Figure 11:
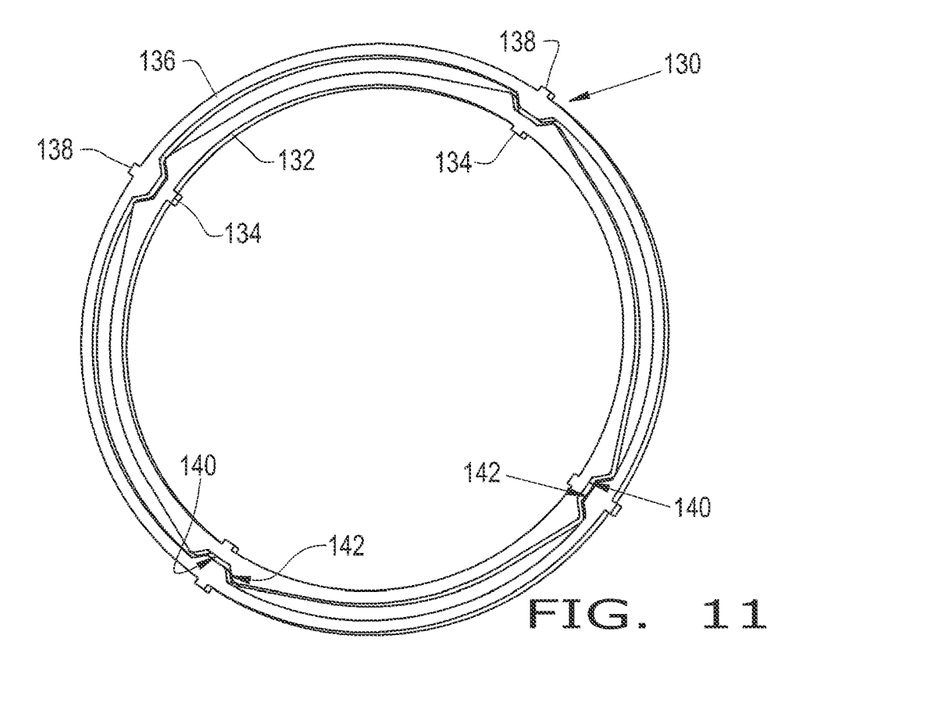
FIG. 11 is a perspective view of an embodiment of a multipart spoke which is receivable within a radial seal.

Referring now to FIG. 11, there is shown an embodiment of a multipart a spoked insert 130. The insert 130 may be fitted within a seal body 72, as described above. The insert 130 may include a first, inner ring 132 with multiple spokes 134 and a second, outer ring 136 with multiple spokes 138. The inner and outer rings 132, 136 may not be directly connected to one another. Instead, the inner and outer rings 132, 136 may removably engageable with one another by way of corresponding mating features 140, 142. The insert 130 may comprise at least one pair of corresponding mating features 140, 142 for movably connecting or engaging the inner ring 132 to the outer ring 136. For example, the insert 130 may comprise multiple corresponding mating features 140, 142. The mating features 140 of the inner ring 132 may be in the form of channels, e.g. U-shaped grooves. The mating features 142 of the outer ring 134 may be in the form of protrusions. As can be appreciated, the mating features 140 may instead be in the form protrusions and the mating features 142 may be in the form channels. The at least one pair of mating features 140, 142 may allow the inner and outer rings 132, 136 to move relative to one another. The insert 130 may comprise any desired material. The inner and outer rings 132, 136 may or may not comprise the same material.

Figure 12:
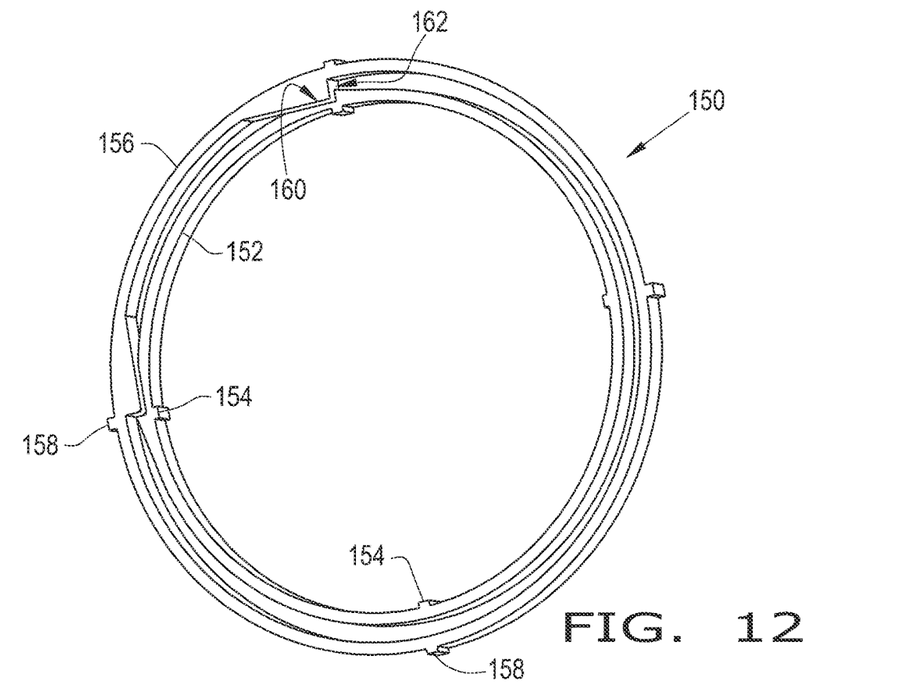
FIG. 12 is a perspective view of an embodiment of another multipart spoke which is receivable within a radial seal.

Referring now to FIG. 12, there is shown an embodiment of a multipart a spoked insert 150. The insert 150 may be substantially similar to the insert 130, as described above. Thereby, the insert 150 may include inner and outer rings 152, 156 with respective spokes 154, 158 and at least one pair of corresponding mating features 160, 162. Each mating feature 160 of the inner ring 152 may be in the form of a recess which defines a ledge. Each mating feature 162 may be in the form of an elongated protrusion or stepped member which at least partially fits within the recess and engages with the ledge. As can be appreciated, each mating feature 160 may instead be in the form of an elongated protrusion and each mating feature 162 may be in the form of a recess.

Figure 13:
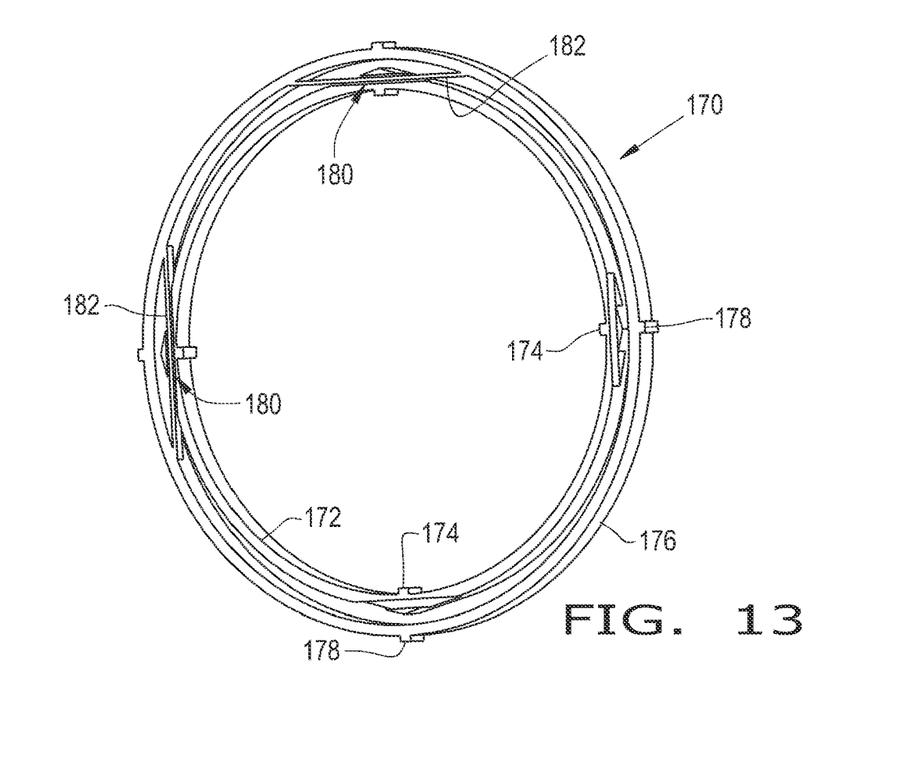
FIG. 13 is a perspective view of an embodiment of another multipart spoke which is receivable within a radial seal.

Referring now to FIG. 13, there is shown an embodiment of a multipart a spoked insert 170. The insert 170 may be fitted within a seal body 72, as described above. The insert 170 may include a first, inner ring 172 with multiple spokes 174 and a second, outer ring 176 with multiple spokes 178. The inner and outer rings 172, 176 may or may not be directly connected to one another. For example, the inner and outer rings 172, 176 may be connected to one another by at least one pair of corresponding mating features 180, 182. The inner ring 172 may have at least one groove 180 that extends partially within the body of the inner ring 172. The outer ring 176 may have at least one bar or arm member 182 which fits within the groove 180 of the inner ring 172.

Figure 14:
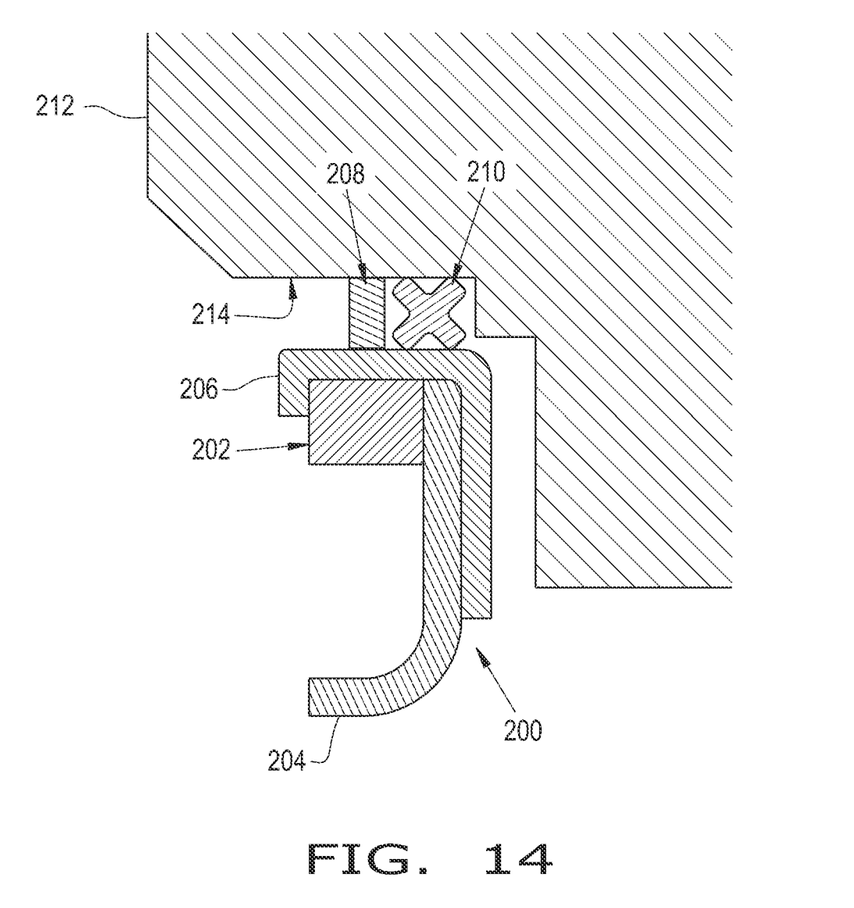
FIG. 14 is a schematic view of another embodiment of a spoked radial seal which includes exterior spokes.

Referring now to FIG. 14, there is shown in schematical form another embodiment of a radial oil seal 200. The seal 200 has a seal body 202 with an inner member 204, which defines the inner diameter, and an outer member 206, which defines the outer diameter. The outer member 206 allows for one or more spokes 208 and an outer diameter seal 210 to rest thereon. The seal 200 may seal a space in between a shaft and a housing 212.

The spoke(s) 208 on the outer diameter 206 prevent(s) rotation of the seal 200. The seal 200 may include only one spoke. The seal 200 may alternatively include multiple spokes. Still yet, the seal 200 may include a spoked member which extends around the entire outer periphery of the outer diameter 206 of the seal body 202. Each spoke 208 adds an amount of rigidity to the seal 200 such that the seal 200 is prevented from rotating along with the shaft. Each spoke 208 may comprise any desired shape and material.

The outer diameter seal 210 seals between a bore or groove 214 in the housing 212 and the seal body 202. The outer diameter seal 210 allows for some movement of the seal 200. For instance, the outer diameter seal 210 may allow some radial movement of the seal 200 as the shaft imparts a force onto the inner diameter 204 of the seal body 202. The outer diameter seal 210 may comprise any desired shape and material. For example, the outer diameter seal 210 may have an X-shaped cross-sectional shape. Hence, the outer diameter seal 210 may be in the form of a X-ring seal.

It should be appreciated that the seal 10, 10A, 30, 50, 70, 90 may or may not be preassembled. Thereby, the seal body and at least one spoke of the seal 10, 10A, 30, 50, 70, 90 may be preassembled together as a single unit or may be assembled by a user upon installation of the seal 10, 10A, 30, 50, 70, 90 onto a shaft or other component. Therein, a manufacturer and/or installer may perform method steps for sealing a shaft, including assembling the at least one spoke within the seal body of the seal 10, 10A, 30, 50, 70, 90 and installing the seal 10, 10A, 30, 50, 70, 90 onto the shaft.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A seal for sealing a shaft, comprising:
   a seal body having an inner member, an outer member, and a connecting member connecting the inner member and the outer member; and
   at least one spoke connected to the seal body, the at least one spoke being configured to stiffen the seal body;
   wherein the at least one spoke is connected to or configured to abut the outer member at one end of the least one spoke and is connected to or configured to abut the inner member at an opposite end of the at least one spoke;
   wherein the at least one spoke is not connected to nor in contact with the connecting member.

2. The seal of claim 1, wherein the inner member is a dynamic member configured to dynamically move and the outer member is a static member configured to remain stationary.

3. The seal of claim 2, wherein the connecting member and the at least one spoke are together configured to allow the inner member to dynamically flex and prevent the seal from rotating.

4. The seal of claim 3, wherein the seal body is configured to dynamically flex in a rotational direction of the shaft without completely rotating with the shaft.

5. The seal of claim 1, wherein the connecting member defines a cavity, wherein the at least one spoke is disposed within the cavity and extends in between the inner member and the outer member.

6. The seal of claim 5, wherein the connecting member comprises a C-shaped cross-sectional shape.

7. The seal of claim 1, wherein the at least one spoke comprises a plurality of spokes.

8. The seal of claim 1, wherein the at least one spoke comprises at least one beam.

9. The seal of claim 1, wherein the at least one spoke comprises a spoked insert which is disposed within the connecting member.

10. The seal of claim 9, wherein the spoked insert is a multipart spoked insert comprising a first ring and a second ring.

11. The seal of claim 10, wherein the multipart spoked insert further comprises at least one ring connecting member rigidly connecting the first ring to the second ring.

12. The seal of claim 10, wherein the multipart spoked insert further comprises at least one pair of mating features configured to engage the first ring with the second ring.

13. A method for sealing a shaft, comprising:
   providing a seal comprising a seal body having an inner member, an outer member, and a connecting member connecting the inner member and the outer member, and at least one spoke;
   wherein the at least one spoke is connected to or configured to abut the outer member at one end of the at least one spoke and is connected to or configured to abut the inner member at an opposite end of the at least one spoke;
   wherein the at least one spoke is not connected to nor in contact with the connecting member;
   inserting the at least one spoke into the seal body such that the connecting member and the at least one spoke are together configured to allow the inner member to dynamically flex and prevent the seal from rotating; and
   connecting the seal to the shaft.

14. The method of claim 13, wherein the seal body is configured to dynamically flex in a rotational direction of the shaft without completely rotating with the shaft.

15. The method of claim 13, wherein the connecting member defines a cavity, wherein the at least one spoke is disposed within the cavity and extends in between the inner member and the outer member.

16. The method of claim 13, wherein the at least one spoke comprises a plurality of spokes.

17. The method of claim 13, wherein the at least one spoke comprises at least one beam.

18. The method of claim 13, wherein the at least one spoke is integrated into the seal body.

* * * * *

UNITED STATES PATENT AND TRADEMARK OFFICE
CERTIFICATE OF CORRECTION

PATENT NO. : 11,486,496 B2
APPLICATION NO. : 17/137888
DATED : November 1, 2022
INVENTOR(S) : Gary Gron et al.

It is certified that error appears in the above-identified patent and that said Letters Patent is hereby corrected as shown below:

In the Claims

Column 7, Claim 1, Line 9, insert --at-- before "least".

Signed and Sealed this
Twentieth Day of December, 2022

Katherine Kelly Vidal
*Director of the United States Patent and Trademark Office*